United States Patent [19]
Dresch et al.

[11] Patent Number: 5,574,578
[45] Date of Patent: Nov. 12, 1996

[54] METHOD AND APPARATUS FOR HOLDING A FILM TRANSPARENCY IN A ROTARY DRUM SCANNER

[75] Inventors: Alan R. Dresch, Worcestershire; Stephen C. Smith; Andrew G. Sokoloff, both of Gloucestershire, all of United Kingdom

[73] Assignee: I.C.G. Ltd., Cheltenham, United Kingdom

[21] Appl. No.: 206,819

[22] Filed: Mar. 7, 1994

[30] Foreign Application Priority Data

| Mar. 10, 1993 | [GB] | United Kingdom | 9304851 |
| Aug. 11, 1993 | [GB] | United Kingdom | 9316683 |
| Aug. 20, 1993 | [GB] | United Kingdom | 9317358 |

[51] Int. Cl.[6] ............................................... H04N 1/08
[52] U.S. Cl. ........................ 358/490; 358/487; 358/493
[58] Field of Search ........................ 358/487, 490–493; H04N 1/08

[56] References Cited

U.S. PATENT DOCUMENTS 4,685,785  8/1987  Mundt et al. .
4,723,134  2/1988  Morita et al. ............................. 358/492
4,963,997  10/1990  Van Scooter ............................. 358/493

FOREIGN PATENT DOCUMENTS

| 1391019 | 4/1975 | United Kingdom . |
| 1592598 | 7/1981 | United Kingdom . |
| 2197964 | 6/1988 | United Kingdom . |

OTHER PUBLICATIONS

B. Coe, "The History of Movie Photography", published 1981, Ash and Grant, p. 32.

Primary Examiner—Kim Yen Vu
Attorney, Agent, or Firm—Donald C. Casey

[57]  ABSTRACT

A film transparency (7) is held by centrifugal force with its emulsion side in contact with the inside of the transparent drum (1) of a rotary drum scanner (1, 2, 3) used in a graphic reproduction process. A transparency locator is in the form of either an insert (4) or a clip device (20) and serves to hold the film transparency in position until the drum is rotating at a sufficiently high speed.

25 Claims, 3 Drawing Sheets

METHOD AND APPARATUS FOR HOLDING A FILM TRANSPARENCY IN A ROTARY DRUM SCANNER

FIELD OF THE INVENTION

This invention relates to the mounting of a film transparency in a graphic reproduction process and more particularly to a method of holding a film transparency in a rotary drum scanner, a transparency locator mountable within the drum of a rotary drum scanner, and to a rotary drum scanner provided with a transparency locator.

1. Brief Description of the Prior Art

Modern methods of producing, for example, posters and other graphic works can require that a film transparency is electronically scanned and the information contained therein stored in digital form. A rotary drum scanner comprises a transparent drum upon which the transparency is mounted and which is then rotated at high speed. A reading head is then moved linearly with respect to the rotating drum to capture the information in the transparency. Conventionally, the transparency is mounted externally of the drum by means of adhesive tape with the celluloid backing material of the film in contact with the drum. In order to reduce the well known problem of Newtons rings, a variety of substances such as lacquer, anti-Newton ring powder and, occasionally, special mounting oil are placed between the film and the glass.

The known mounting methods are time consuming and can be messy.

2. Brief Description of the Invention

According to one aspect of the invention a method of holding a film transparency in a rotary drum scanner includes holding the film transparency with its emulsion side in contact with the inside of the drum by centrifugal force as the drum is rotated.

The problems associated with Newtons rings can be minimised by mounting the emulsion side of the film in contact with the drum to the extent that no special precautions are necessary. Furthermore, because the film is held by centrifugal force internally of the drum, this can mean that there is no need to use adhesive tape.

The method preferably includes retaining the film transparency in position within the drum before the drum is rotated. In this case the method preferably includes using a transparency locator mounted inside the drum to retain the transparency. The method may include using an insert within the drum as the transparency locator. Alternatively the method may include using a clip device within the drum as the transparency locator.

According to another aspect of the invention a transparency locator is mountable within the drum of a rotary drum scanner and defines means for holding a film transparency in position until the drum is rotating at a sufficiently high speed for the transparency to be forced centrifugally into contact with the inside of the drum.

The transparency locator may comprise an insert of substantially cylindrical shape with a recess in its outermost surface within which the transparency can be placed, and an aperture within the recess to allow the image portion of the film transparency to be illuminated. Preferably means are provided for resiliently biasing the insert into engagement with the inside of the drum. In this case the insert may be formed from a resilient material as a generally cylindrical shape having a diameter slightly greater than an internal diameter of the drum, and the insert includes a longitudinally extensive gap to enable the insert to be resiliently contracted for insertion into the drum.

Alternatively the transparency locator may comprise a clip device for insertion inside the drum to hold one edge of the transparency against the inside of the drum. Preferably the clip device includes at least one resiliently movable member for cooperating with the inside of the drum to define a nip which is less than the thickness of a transparency. In this case the resiliently movable member may be a head attached by a flexible stem to a base portion, whereby insertion of the edge of a transparency into the nip will resiliently deform the stem to hold the transparency in position. Alternatively the clip device may be a spring clip having a plurality of resiliently deformable fingers, and each finger is dimensioned to co-operate with the inside of the drum to define a nip which is less than the thickness of a transparency.

According to a further aspect of the invention a rotary drum scanner has a transparency cylindrical drum on which a film transparency is to be mounted for scanning, and a transparency locator mounted within the drum to hold a transparency in contact with the inside of the drum.

The transparency locator may be an axially-withdrawable insert of substantially cylindrical shape having at least one recess in its outermost surface for receiving a transparency, and an aperture within each recess for illuminating the transparency. The outermost surface of the insert may be resiliently biased into engagement with the inside of the drum. Alternatively the insert may be generally cylindrical, with an outside diameter slightly greater than an internal diameter of the drum, and formed for resilient contraction to enable its insertion into the drum. In this case the insert may have a longitudinal gap to facilitate the resilient contraction.

The transparency locator may alternatively be a clip device mounted inside the drum to hold at least one edge of a tranparency against the inside of the drum. The clip device may have at least one resiliently movable member for co-operating with the inside of the drum to define a nip which is less than the thickness of a transparency. The resiliently movable member may be a head attached by a flexible stem to a base portion whereby insertion of the edge of a transparency into the nip will resiliently deform the stem to hold the transparency in position. Alternatively the clip device may be a spring clip having a plurality of resiliently deformable fingers, and each finger is dimensioned to co-operate with the inside of the drum to define a nip which is less than the thickness of the transparency.

The clip device may be located at the interface between the drum and a support base. It also may be located against axial movement relative to the drum. The clip device is preferably removable from the drum to facilitate cleaning of the drum.

BRIEF DESCRIPTION OF THE DRAWINGS

The invention will now be described, by way of example only, with reference to the accompanying diagrammatic drawings, in which.

DETAILED DESCRIPTION OF THE PREFERRED EMBODIMENTS

Figure 1:
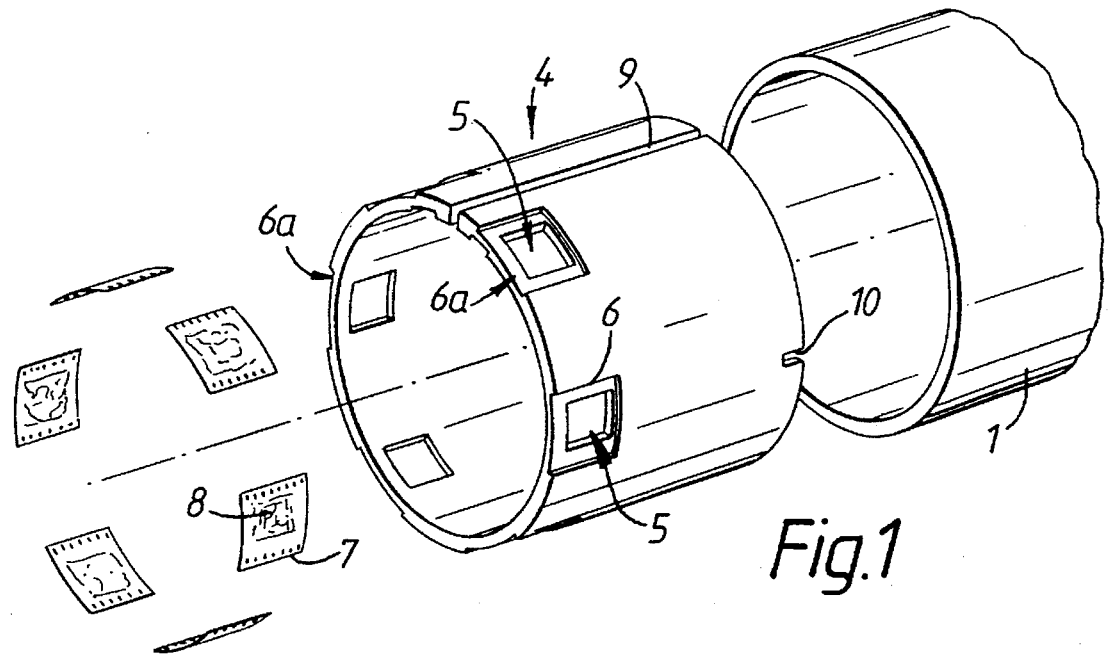
FIG. 1 is an exploded perspective view of part of a drum scanner and a transparency locator in the form of an insert.
Figure 2:
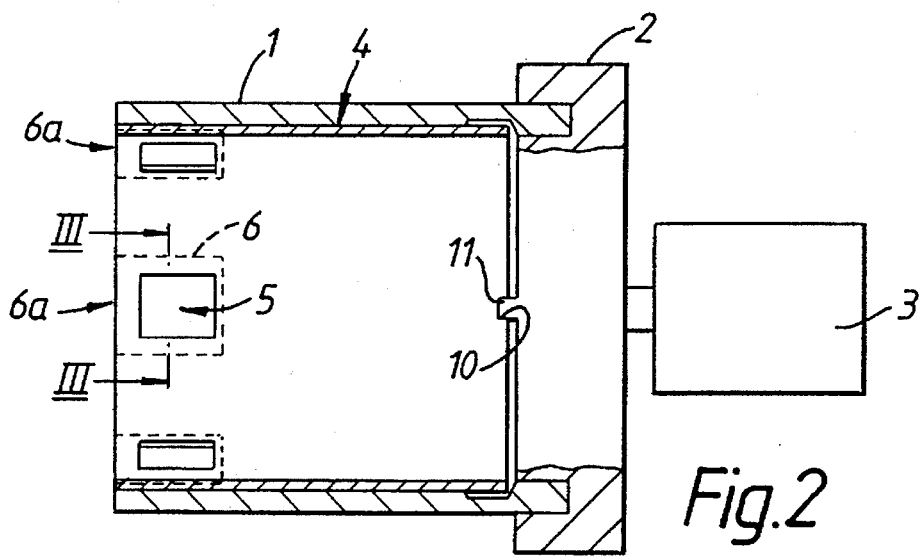
FIG. 2 is a partly schematic longitudinal sectional view through the assembly shown in FIG. 1 in an assembled condition.
Figure 3:
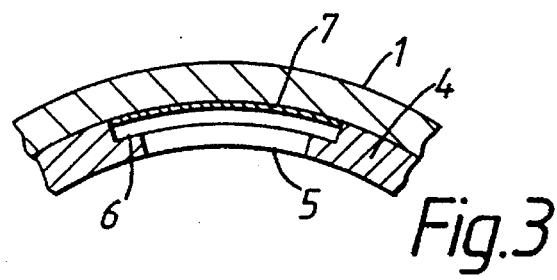
FIG. 3 is a cross-sectional view taken on the line 3—3 in FIG. 2.

With reference to FIGS. 1 to 3, a conventional drum scanner comprises a substantially cylindrical transparent drum 1 formed from an optically finished transparent material. One end of the drum 1 is supported within a base 2. The drum is rotatable by a motor 3, or other suitable drive means. Although not shown in the accompanying drawings, known drum scanner apparatus include a light source mountable within the drum and a reading head disposed externally of the drum which is moved linearly as the drum is rotated. The drum is preferably removable from the accompanying apparatus for transparency mounting and cleaning purposes.

In accordance with the present invention a transparency locator, in the form of an insert 4 of generally cylindrical shape, includes a plurality, of circumferentially spaced through holes 5, six being shown. From FIG. 3 it will be seen that the outer most surface of the insert 4 surrounding each of the holes 5 includes a recess 6 of at least equal area:and thickness to that of a film transparency 7. Each hole 5 is dimensioned so as to correspond to the image portion 8 of the film transparency 7 to allow the image portion 8 to be illuminated.

The insert 4 is formed of a suitable resilient material and includes a longitudinally extensive gap 9 to enable the insert to be resiliently contracted for insertion into the drum. One or more notches 10 are provided to allow the insert to be aligned correctly within the drum 1 by means of a corresponding peg or pegs 11 provided in the base plate 2.

In use the insert 4 is squeezed so as to close the gap 9 and is then inserted within the drum 1 until the pegs 11 engage with their respective notches 10. The film transparencies 7 are then slid into the respective open ends 6a of the recesses 6 with their emulsion, or gelatine, sides facing outermost. The insert 4 serves to prevent the transparencies 7 from moving about until the drum is rotating at a sufficiently high speed, typically between 600 and 2000 RPM, for the transparencies to be urged outwardly and for their respective emulsion sides to be forced into contact with the inner most face of the drum.

Different inserts may be provided appropriate to the different types of film format available. The insert may be arranged such that the transparencies are firstly mounted on the insert, which is then placed within the drum.

Figure 4:
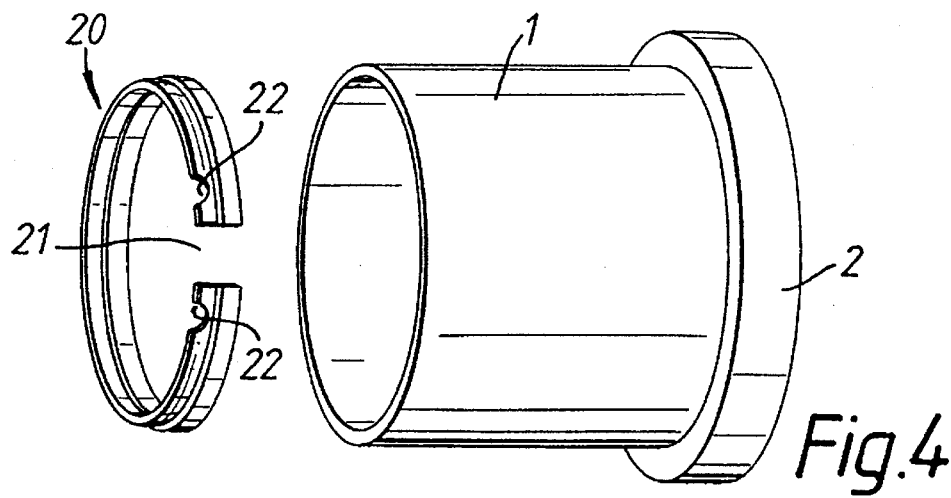
FIG. 4 is an exploded perspective view of part of a drum scanner and an alternative transparency locator in the form of a clip device.
Figure 5:
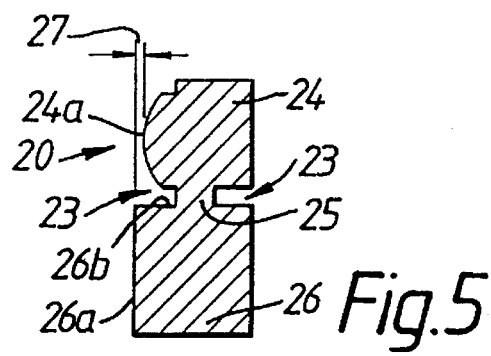
FIG. 5 is a cross-sectional view through the insert shown in FIG. 4.

As shown in FIG. 4 an alternative transparency locator, in the form of a clip device 20, is formed from a resilient plastics material having a gap 21. Finger receiving recesses 22 are provided to enable the clip device 20 to be closed and inserted within the drum, whereupon its inherent resilience urges it into contact with the inside of the drum. As shown in FIG. 5, clip device 20 is a ring having recesses 23 formed in the inner and outermost surfaces so as to define a resiliently movable head portion 24 connected by a resilient stem 25 to a base portion 26. The radially outermost face 24a of the head portion 24 is radiused and is offset by a small amount relative to the corresponding face 26a of the base portion to define a nip 27 which is less than the thickness of a transparency.

Figure 6:
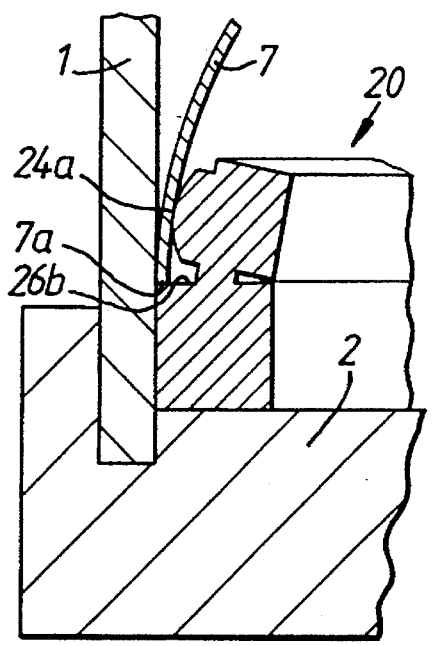
FIG. 6 is a cross-sectional view through part of the assembly shown in FIG. 4 with the insert of FIG. 5 shown in its operative position.

Whilst the ring 20 is located at the base of the drum, as shown in FIG. 6, the edge of a transparency 7 is inserted into the space between the outermost face 24a and the drum 1. The radiused surface 24a and the offset 27 enables the lower most edge 7a of the transparency to be easily located against the uppermost surface 26b of the base portion. The transparency is then held by one edge 7b until the drum is rotating at a sufficiently high speed for the remainder of the transparency to be urged into contact with the inside of the drum.

Figure 7:
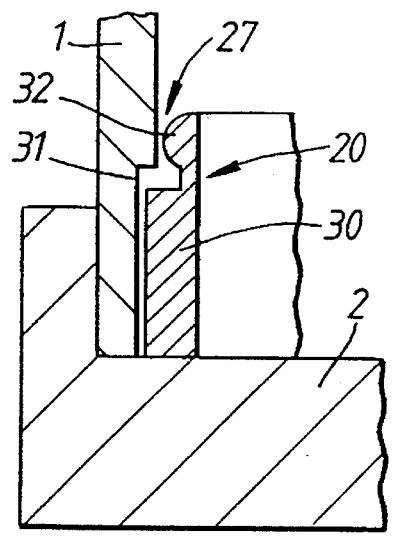
FIGS. 7, 8 and 9 are cross-sections similar to FIG. 6 but illustrating the use of different forms of clip device.
Figure 8:
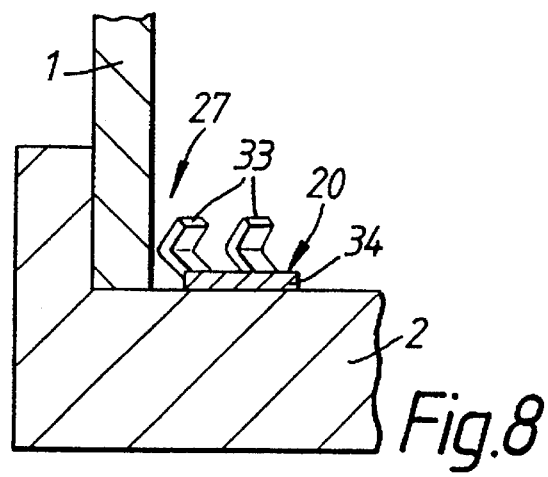
Figure 9:
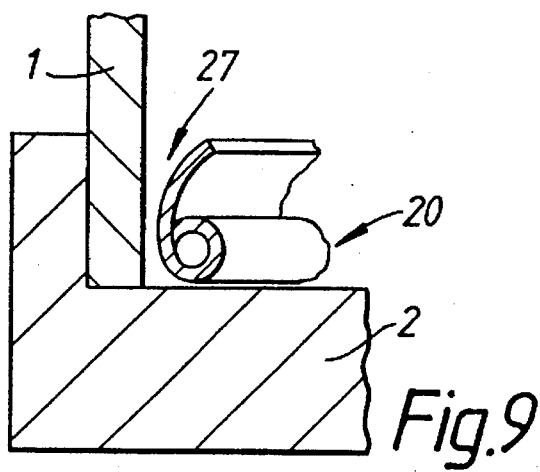

FIGS. 7, 8 and 9 are generally similar to FIG. 6 and equivalent components have been identified with the same reference numerals. In FIG. 7 the clip device 20 has an enlarged end 30 which is located in a groove 31 formed in the drum 1. In this manner the clip device 20 is retained against unintentional axial withdrawal from the drum 1 but can be released for clearning by first detaching the drum 1 from its base 2. The clip device 20 may be formed as a complete ring of flexible material so that its rim 32 will deform to permit the edge of a transparency to be pressed into the nip. However, the rim 32 may be separated into a series of independently sprung fingers.

FIG. 8 illustrates a clip device 20 formed by a series of fingers 33 formed integral with a disc 34 which is detachably secured in any convenient manner to the base 2.

FIG. 9 illustrates a different clip device 20 formed as a curled ring, as shown, which may be located in any convenient manner to be detachable for cleaning.

A scratch resistant coating may be provided on the inside of the drum (1) and/or on the outside of the transparency locator to prevent damage when the locator is withdrawn or inserted into the drum.

We claim:

1. A method of holding a film transparency in a rotary drum scanner comprising:

providing a rotary drum scanner having a transparent cylindrical drum and means for rotating said drum about its longitudinal axis, said drum having an inside and an outside surface:

providing a film transparency having an image portion and an emulsion-containing side thereon;

rotating said drum about its axis while holding the film transparency including the image portion thereof with its emulsion side in contact with the inside surface of said drum solely by the centrifugal force exerted thereon, as said drum is rotated.

2. A method, according to claim 1, further comprising retaining the film transparency in position with said drum before said drum is rotated.

3. A method, according to claim 2, including providing a transparency locator mounted inside said drum to retain the film transparency.

4. A method, according to claim 3, including using an insert within said drum as the transparency locator, the insert including a recess within which the film transparency is placed and an aperture within the recess to allow the image portion to be illuminated.

5. A method, according to claim 3, including using a clip device within said drum as the transparency locator.

6. A transparency locator for locating a film transparency to a cylindrical drum of a rotary drum scanner, said drum having an inside and an outside surface, said transparency locator comprising:

means for mounting said transparency locator within said drum; and means for holding the film transparency in position against the inside surface of said drum until said drum is rotating at a sufficiently high speed for the film transparency, including the image portion thereof, to be forced centrifugally into contact with the inside surface of said drum.

7. A transparency locator, according to claim 6, comprising an insert of substantially cylindrical shape with a recess in its outermost surface within which the film transparency is placed, and an aperture within the recess to allow the image portion of the film transparency to be illuminated.

8. A transparency locator, according to claim 7, including means for resiliently biasing the insert into engagement with the inside of said drum.

9. A transparency locator, according to claim 7, in which the insert is formed from a resilient material as a generally cylindrical shape having a diameter slightly greater than an internal diameter of said drum, and the insert includes a longitudinally extensive gap to enable the insert to be resiliently contracted for insertion into said drum.

10. A transparency locator, according to claim 6, comprising a clip device for insertion inside said drum to hold one edge of the film transparency against the inside surface of said drum.

11. A transparency locator, according to claim 10, in which the clip device includes at least one resiliently movable member for co-operating with the inside surface of said drum to define a nip which is less than the thickness of the film transparency.

12. A transparency locator, according to claim 11, in which the resiliently movable member is a head attached by a flexible stem to a base portion, whereby insertion of the edge of the film transparency into the nip will resiliently deform the stem to hold the film transparency in position.

13. A transparency locator, according to claim 10, in which the clip device is a spring clip having a plurality of resiliently deformable fingers, and each finger is dimensioned to co-operate with the inside surface of said drum to define a nip which is less than the thickness of the film transparency.

14. A rotary drum scanner for scanning an image from a film transparency comprising:

a transparent cylindrical drum to which the film transparency is to be mounted for scanning, said drum having an inside surface and an outside surface:

means for rotating said drum about its longitudinal axis;

means for mounting the transparency locator within said drum wherein the transparency locator holds the film transparency until the drum is rotating at a sufficiently high speed for the film transparency to be forced centrifugally into contact with the inside surface of said drum.

15. A scanner, according to claim 14, in which the transparency locator is an axially-withdrawable insert of substantially cylindrical shape having at least one recess in its outermost surface for receiving a film transparency and an aperture within each recess for illuminating the film transparency.

16. A scanner, according to claim 15, in which the outermost surface of the axially withdrawable insert is resiliently biased into engagement with the inside surface of said drum.

17. A scanner, according to claim 15, in which the axially withdrawable insert is generally cylindrical, with an outside diameter slightly greater than an internal diameter of said drum, and formed for resilient contraction to enable its insertion into said drum.

18. A scanner, according to claim 17, in which the axially withdrawable insert has a longitudinal gap to facilitate the resilient contraction.

19. A scanner, according to claim 14, in which the transparency locator is a clip device mounted inside said drum to hold at least one edge of the film transparency against the inside surface of said drum.

20. A scanner, according to claim 19, in which the clip device has at least one resiliently movable member for cooperating with the inside of said drum to define a nip which is less than the thickness of the film transparency.

21. A scanner, according to claim 20, in which the resiliently movable member is a head attached by a flexible stem to a base portion whereby insertion of the edge of the film transparency into the nip will resiliently deform the flexible stem to hold the film transparency in position.

22. A scanner, according to claim 19, in which the clip device is a spring clip having a plurality of resiliently deformable fingers, and each finger is dimensioned to co-operate with the inside surface of said drum to define a nip which is less than the thickness of the film transparency.

23. A scanner, according to claim 19, which the means for rotating said drum comprises a support base to which said drum is attached and in which the clip device is located at the interface between said drum and said support base.

24. A scanner, according to claim 23, in which the clip device is located against axial movement relative to said drum.

25. A scanner, according to claim 14, in which the film transparency locator is removable from said drum to facilitate cleaning of said drum.

* * * * *

UNITED STATES PATENT AND TRADEMARK OFFICE
CERTIFICATE OF CORRECTION

PATENT NO. : 5,574,578
DATED : November 12, 1996
INVENTOR(S) : Alan DRESCH et al.

It is certified that error appears in the above-indentified patent and that said Letters Patent is hereby corrected as shown below:

--14. (Twice Amended) A rotary drum canner for scanning an image from a film transparency comprising:
 a transparent cylindrical drum to which the film transparency is to be mounted for scanning, said drum having an inside surface and an outside surface:
 means for rotating said drum about its longitudinal axis;
 means for mounting [the] a transparency locator within said drum wherein the transparency locator hold the film transparency until the drum is rotating at a sufficiently high speed for the film transparency to be forced centrifugally into contact with the inside surface of said drum--

Signed and Sealed this

Ninth Day of September, 1997

*Attest:*

BRUCE LEHMAN

*Attesting Officer*  Commissioner of Patents and Trademarks